United States Patent

Nailen

[15] 3,699,254

[45] Oct. 17, 1972

[54] CODE TONE PULSE TRAIN DATA TRANSMITTING AND RECEIVING SYSTEM USING SINE WAVE GATING

[72] Inventor: James C. Nailen, Santa Ana, Calif.

[73] Assignee: International Data Systems, Reno, Nev.

[22] Filed: Nov. 17, 1969

[21] Appl. No.: 877,208

[52] U.S. Cl.................178/66 R, 340/168, 179/2 DP, 340/359

[51] Int. Cl...............................................H04l 27/00

[58] Field of Search.....179/2 DP, 2 A, 15 BM, 90 R; 325/164; 340/167 A, 168, 147 PT, 359, 345; 178/66 R, 66 A, 58

[56] References Cited

UNITED STATES PATENTS

| | | | |
|---|---|---|---|
| 3,388,375 | 6/1968 | Sloughter | 179/2 C |
| 3,141,929 | 7/1964 | George | 178/66 |
| 3,088,099 | 4/1963 | Duvall | 340/167 |
| 2,373,134 | 4/1945 | Massonneau | 340/359 |

*Primary Examiner*—Kathleen H. Claffy
*Assistant Examiner*—Thomas D'Amico
*Attorney*—Albert L. Gabriel

[57] ABSTRACT

Method and apparatus for transmitting data through the medium of ordinary telephone lines and handsets. Character information is generated in the form of gated sine wave tone bursts of a fixed audio frequency compatible with the telephone system, wherein the character information is contained in the number of continuous sine wave cycles in each tone burst. The sharp rise and decay times normally associated with pulse transmission, and consequent ringing and interference with reserved frequency areas, are avoided by substantially zero crossover initiation and termination of each tone burst, and PDM distortion is minimized by a combination of partial modulation, substantial on time-to-off time, and optimum frequency selection for harmonic and subharmonic rejection by telephone system rolloff.

4 Claims, 10 Drawing Figures

INVENTOR.
JAMES C. NAILEN
By Albert L. Gabriel
ATTORNEY.

INVENTOR.
JAMES C. NAILEN
By
Albert L. Gabriel
ATTORNEY.

INVENTOR.
JAMES C. NAILEN
By
Albert L. Gabriel
ATTORNEY.

INVENTOR.
JAMES C. NAILEN
By Albert L. Gabriel
ATTORNEY.

INVENTOR.
JAMES C. NAILEN
By Albert L. Gabriel
ATTORNEY.

INVENTOR.
JAMES C. NAILEN
By Albert L. Gabriel
ATTORNEY.

INVENTOR.
JAMES C. NAILEN
By Albert L. Gabriel
ATTORNEY.

INVENTOR.
JAMES C. NAILEN
By Albert L. Gabriel
ATTORNEY.

INVENTOR.
JAMES C. NAILEN
By Albert L. Gabriel
ATTORNEY.

CODE TONE PULSE TRAIN DATA TRANSMITTING AND RECEIVING SYSTEM USING SINE WAVE GATING

BACKGROUND OF THE INVENTION

The present invention relates to the transmission of data to a data processing center from a data terminal at any point-of-origin data source. Today there is a large and rapidly growing volume of information transmitted from data terminals in the field to computers at data processing centers. Such data is generally transmitted over existing telephone lines, which provide a widespread established communications network capable of directing data from almost any portable or fixed source of origin to a processing center.

Early data transmitting systems which made use of telephone lines were "hard wired" digital systems such as telegraph, Telautograph, and similar systems, which could not be handled on voice grade telephone lines, but required the use of dedicated, closed loop systems that are far more expensive than conventional voice grade telephone lines and are only suitable for permanent or stationary data terminal installations.

However, in recent years computers have become available to the general public at data processing centers, and it has become common practice to transmit data from such remote data terminals as adding machines, teletypewriters or other business machines to these data processing centers over voice grade telephone lines. Examples of the type of information thus transmitted are credit and banking information, invoicing, medical information, car license information, police records, and the like. It is now common to acoustically couple such remote and generally portable data terminals to the telephone network through a conventional telephone handset so as to avoid hard wiring that is particularly objectionable to telephone companies.

All data transmission systems currently in use which thus utilize voice grade telephone lines employ digital principles of recording and transmission, the majority of such systems today employing an eight-bit format of transmission with a ninth bit required for clocking or synchronization. While such digital oriented information may be the present universal data transmission language, and is a convenient means for converting machine-generated information or "machine talk" into intelligence that is readily transmitted and consumed by computers, it nevertheless involves a number of serious problems both at the remote data terminal and in the transmission thereof where ordinary telephone lines are utilized, causing prior art equipment of this type to be expensive and relatively slow in operation, so that it has only come into limited fields of use despite a widespread need for equipment which will perform this type of function at reasonable cost and at rapid transmission rates.

Digital oriented information originates with square wave signals, and the transmission of square wave, digital information is inherently slow. Thus, on the average of about four to seven bits are required for each character that is transmitted, and with straight binary on-off type square wave pulsing, only between about 10 and 20 pulses or bits per second can be transmitted over ordinary telephone lines, which means that at best only about five characters per second can thus be transmitted. Even with the best prior art methods of handling digital oriented information, wherein the digital signal is changed to an FM analog signal, only about 150 bits per second can be transmitted, or in the range of about 20 to 40 characters per second.

Square wave digital transmission is completely incompatible with voice grade telephone lines. These telephone lines are strictly adapted for sine wave voice transmission, and none of the telephone company equipment is adapted to accommodate the fast rise and decay times associated with square wave transmission. The high inductance and capacitance of the telephone system tends to reduce such square wave digital signals to sine waves, resulting in harmonics and ringing in the system, with resultant cross talk and general interference with normal operation of the telephone system. With square wave digital transmission over telephone lines, each pulse must be allowed sufficient time to ring down before the next pulse is applied, in order to reliably distinguish the discrete pulses, and this results in so much space between sequential pulses that the very slow transmission rate mentioned above is the result.

Because of the aforesaid incompatibility of square wave digital transmission with ordinary telephone lines, it is current practice to employ a "data set" which changes the digital signal to an analog signal which is an FM type of signal utilizing a frequency shift from one signal to another to identify the pulses. This analog signal is more accurately defined as a frequency-shift-keyed (FSK) signal, wherein one frequency is used for the pulse or "mark" condition, and another frequency is used for the no-pulse or "space" condition. Such a data set normally uses the usual teletypewriter exchange (TWX) frequency assignments in what is designated the F1 band with 1,070 Hz for space and 1,270 Hz for mark. While such FM data sets produce a type of transmitted signal that is much more compatible with telephone lines than square wave pulse signals, and increase the data transmission rate up to about 150 bits per second, or on the order of from about 20 to 40 characters per second, they are very expensive and still quite slow compared with the inherent capability in such digital information. Aside from the inherent time consumption of bit stream information, the FM data set requires many frequency cycles to identify the frequency shift, generally on the order of 10 to 20 cycles of each frequency per bit, thus seriously limiting the speed of data transmission using the FM data set.

Most data which is gathered at the source and then transmitted from a data terminal through telephone lines to a time shared or other central computer must be buffer stored in a tape recorder associated with the data terminal prior to actual transmission. It is estimated that this is true in more than 95 percent of the cases. One of the major problems in buffer storage of digital oriented information, and in particular such information which is to be played back through an FM data set, is that it is essential to employ a tape recorder embodying a very expensive precision-made incremental tape drive mechanism. Typically, such precision-made incremental tape drive mechanisms cost more than 30 times the price of simple on-the-shelf tape drive mechanisms which are satisfactory for most recording and playback situations. Such precision incremental tape drives are required to minimize tape speed variations and consequent frequency changes which throw the signals out of phase and tend to cause dropouts. However, any power failure or substantial voltage change will still adversely affect even such expensive tape drive equipment. Additionally, because of problems inherent in the telephone network itself, the FM data set signals will often become out of phase or will go in and out of phase in a "yo-yo" or phase jitter effect, which will interfere with transmission and with the telephone network, sometimes causing the signals to encroach upon the telephone company's reserved frequency areas.

The timing with current methods of data transmission, including that through FM data sets, must be perfectly matched at the transmitting and receiving ends, and this requires the use of a separate clocking or synchronizing pulse which further complicates and slows down the operation of the system. This synchronization between transmitter and receiver in conventional systems prevents buffer tape storage at normal operating speed and then replay for transmission at an increased rate of speed.

In general, as long as digital principles of recording and transmission are employed in source data capturing and transmission to data processing centers, low cost data terminals are out of the question, and as a result the usage thereof is severely limited. A wide variety of applications of source data capturing and transmittal to processing centers simply await the advent of low cost, efficient system of this type.

Another problem in connection with portable remote data terminals of the type that is adapted to be acoustically coupled with any convenient telephone handset is that there tends to be a critical problem of standing sound waves and echo effects, and also of transducer resonation in the transducer employed for converting the electrical pulse information into sound energy. Such undesirable effects tend to interfere with frequency and phase stability which are critical in conventional systems.

While there were several early attempts to transmit character information by sine wave tone bursts, such attempts never resulted in satisfactory working systems which would be in any way competitive in today's market. Such early attempts generally involved definition of the discrete sine wave bursts by initiating and decaying an oscillator, with no consideration of zero point gating of discrete sine wave forms. Accordingly, signal transmission was slow and the detection of discrete tone bursts uncertain.

Prior to the present invention, the applicant is not aware of any serious attempt in recent years to define character information by sine wave tone bursts of different lengths in source data capturing and transmission to data processing centers, and the applicant believes that the reason for this is that those working in this particular art, based upon the work and publications of Nyquist and Shannon of Bell Laboratories considered that sine wave pulse tone bursts could not be employed effectively or competitively for data transmission because of pulse duration modulation (PDM) distortion. According to the teachings of Nyquist and Shannon, PDM distortion must result in an additional half-cycle of substantial amplitude at the end of such a sine wave tone burst despite zero crossover cutoff of the sine wave, and as a result those in the art generally considered a system of this type to be impractical.

SUMMARY OF THE INVENTION

It is a general object of the present invention to provide a novel method and apparatus for transmitting data which completely departs from the conventional approach of digital recording and transmission, and instead utilizes the transmission of sine wave tone bursts wherein an assigned character, rather than digital information, is contained in the number of continuous sine wave cycles in a fixed frequency tone burst. Such assigned character can be numeric, alpha, or any other desired value. Generally from two up to sixteen or more sine wave cycles will be contained in a particular pulse train representing an assigned character.

By thus employing substantially pure sine wave pulse trains for designating character information, the present system is rendered fully compatible with ordinary Class 4 telephone equipment. By not only employing the type of wave form best suited to conventional telephone equipment, but also by avoiding rapid rise and decay times by novel timing and gating means in the transmitter part of the system to provide substantially zero crossover gating of the sine waves at both inception and termination, ringing and interference with the telephone system is minimized, and most efficient data transmission is assured. Thus, ringing and other factors requiring slow transmission for simple square wave digital information are completely avoided with the present invention.

Similarly, by employing substantially pure sine wave tone bursts to designate character information, the present invention avoids the need for use of a conventional FM or frequency-shift-keyed (FSK) data set which converts to a frequency shifting analog signal, thereby avoiding the various difficulties associated with such data sets discussed hereinabove, such as limitation of the transmission rate because of the 10 to 20 cycles of each frequency required for identification, need for expensive buffer tape storage equipment with precision incremental tape drives, uncontrollable phase shifting, yo-yoing and the like, with attendant dropouts, and requirement for a separate clocking or synchronizing signal.

It is accordingly an important object of the present invention to provide a novel method and apparatus of the character described for source data capturing, transmitting, and receiving, which permits a substantial increase in the rate of data recording and transmitting as compared with conventional digital oriented methods and apparatus currently in use for the same purpose. Thus, with the present system, data can be recorded and transmitted on ordinary voice telephone lines on the order of from about 5 to about 15 times faster than with current digital systems. With the present system an average of about seven sine wave cycles per character is required, but this can be somewhat reduced on the average by assigning a low number of cycles to those characters that are most used. At the preferred operating frequency of approximately 3,100 cycles per second, up to 350 to 400 characters per second can be stored and transmitted over ordinary voice telephone lines with the present invention.

With the present system there is no need for synchronization of the receiver with the transmitter, as the receiver circuit simply counts the number of oscillations in a tone burst. Accordingly, the system does not require the use of a clocking signal for normal operation, and a character value will be correctly recognized in the receiver regardless of delays or frequency variations. Because of the fact that synchronization between the transmitter and receiver are unnecessary, data can be recorded with the present invention at any desired recording speed, and then can be played back for transmission at a much higher speed, and the frequency change does not impair operation of the system.

Another important object of the present invention is to provide a novel method and apparatus of the character described for capturing, transmitting and receiving data, wherein buffer tape storage can be accomplished with almost any off-the-shelf tape recorder regardless of how inexpensive the tape drive mechanism may be, thus greatly reducing the cost of remote data terminal equipment by eliminating the need for the usual expensive precision incremental drive mechanism, thereby making the advantages of data processing available in many applications where it is desirable but the cost is now prohibitive.

Since the present invention employs a fixed frequency and does not utilize the phase shifting of the FSK signal produced by conventional data sets, the method and apparatus of the present invention are not sensitive to power phase shifts and voltage changes. Also, the power supply requirements of the present invention are quite low, and the invention is readily adaptable to hand-carried portable battery operated units. These factors, along with the low cost of termination equipment, further cooperate in opening up many new areas of usage of this type of equipment which could not be serviced by digital oriented data termination and transmitting equipment.

An example of an area of usage which can be serviced by the present invention, but which is virtually impossible to handle with conventional digital oriented equipment because of both cost and power difficulties, is inventory tag reader data terminals for large retail store chains. Inventory logging and processing is a very costly and time-consuming procedure when handled manually in the usual way, and could be made much more efficient by accumulating the information at local data terminals and transmitting the data to processing centers. However, the large number of data terminals that would be required for each large retail store would make the cost excessive with present digital equipment, and in a large percentage of the existing retail stores the electrical wiring is old and incapable of handling present power demands or the stores are located in uncertain power areas, so that power stability is inadequate for present digital systems. Looking at a specific example of this type, Sears, Roebuck & Co. has over 1,000 stores and more than 60percent of these have old wiring which cannot handle present power demands, and many of these stores are located in uncertain power areas where the voltage sometimes goes as low as 80 volts in 110 to 120 volt lines. A typical requirement for inventory tag reading in stores of this size would be on the order of 60 to 65 terminals per store. It will be apparent that conventional digital terminal equipment as hereinabove described could not be used for inventory tag reading in stores of this character both because of the excessive cost and because of its inability to function properly with such uncertain power available. On the other hand, the method and apparatus of the present invention is low enough in cost and sufficiently insensitive to such power variations so as to be generally satisfactory for such a use.

While it will be understood that the present invention is adapted for a wide variety of data gathering and transmitting purposes, several examples of uses to which the system is ideally suited are given at this point to illustrate both the adaptability and the wide scope of application of the invention. Thus, for example an accountant periodically auditing his clients' books can simply place the information on the buffer storage tape with a data terminal according to the present invention, and then transmit a day's or a week's accumulation of such taped information to a data processing center.

Another example of a use for which the present invention is particularly well suited is for both inventory and ordering in retail grocery stores, and for inventory, ordering, and delivery in wholesale grocery business. As a specific example, Certified Grocers in Southern California supplies some 3,300 stores, the average store placing about two orders per week for a given quantity of some 1,000 items. This presents a large problem in data processing and delivering out, and currently requires a great deal of manual effort and involves manifests of many pages. Small, portable data terminals embodying the principles of the present invention can make this type of processing much more efficient.

Similarly, the present invention can greatly simplify data handling at a reasonable cost in such other areas as common carrier deliveries, linen and milk truck deliveries, handling of banking and credit information, processing doctors' insurance claims, and the like.

The compatibility of the present invention with ordinary telephone lines, and the high speed of data transmission inherent therewith, makes the invention suitable for use in an interface application from one data processing center to another.

Another object of the present invention is to provide a novel acoustic coupling arrangement for feeding data from a terminal according to the invention to a conventional telephone handset transmitter wherein a barium titanate or lead titanate ceramic transducer of high resonant frequency is directionally arranged relative to the handset microphone with their axes displaced within the range of 20° plus or minus 10°, whereby standing waves, echo effects, resonations and the like are minimized so as to eliminate spurious signals which might otherwise interfere with the operation of the system, while at the same time optimum acoustic coupling is obtained.

A further object of the invention is to provide a novel method and apparatus for gating a continuously generated, constant frequency sine wave in tone bursts of varying numbers of cycles designating character information, at substantially zero crossover initiation and termination points, thereby avoiding sudden rise or decay times such as would be associated with arbitrary gating at any substantial positive or negative amplitude position on the sine wave, and avoiding the resulting harmonics and ringing which would interfere with the telephone system, and thereby also avoiding the time delays which were associated with the initiation and shutting off of an oscillator as with prior art attempts to transmit character information by sine wave tone bursts.

A still further object of the invention is to provide a novel method and apparatus for reducing PDM distortion in the generation and transmission of gated sine wave tone bursts of character information to a level which permits reliable discrimination in the reception of such information without the use of either critical or expensive equipment, and which for the first time renders the accumulation and transmission of data in the form of such gated sine wave tone bursts of character information reliable and practical and economical. Despite the adverse teachings of Nyquist and Shannon which have heretofore discouraged the development of a satisfactory system for data accumulation and transmission in the form of gated sine wave tone bursts of character information, the applicant has found that by a combination of three techniques, each of which contributes to substantially reduce this PDM distortion effect, the net PDM distortion can be minimized to the extent that a code tone pulse train data transmitting system of the character described is rendered practical.

One of these three techniques which the applicant has employed in the present method and apparatus for reducing PDM distortion is to provide a constant amplitude sine wave background of substantially the same frequency as the tone bursts so as to reduce the modulation from the usual 100percent to a partial modulation. Fourier analysis shows that even with the sine wave tone burst started and stopped at the zero reference point, there are strong third and fifth harmonics associated with the basic sine wave, and with the usual 100percent modulation of such a tone burst these harmonics can result in an unwanted additional half-cycle after cutoff that has almost as much amplitude as the basic sine wave before cutoff. However, test apparatus according to the invention has revealed that this effect of these harmonics is greatly reduced by providing a constant amplitude background sine wave of substantially the same frequency so that the tone bursts are reduced from 100percent modulation to a partial modulation in a preferred range of from about 40 to about 80percent modulation.

Another technique employed in the present invention which cooperates with this partial modulation to reduce PDM distortion is to employ substantial on time-to-off time of the sine wave tone bursts. If 100percent modulation were employed, the unwanted additional half-cycle pulse would theoretically have an amplitude approximately equal to the square root of the reciprocal of total time between pulses to pulse off time. For example, if one sine wave cycle is transmitted, and then transmission is off for an interval corresponding to two cycles, making a total time equivalent to three cycles, the reciprocal of total time to off time is about 0.67, and the square root of that is approximately 0.8, so with 100percent modulation the unwanted additional half pulse would be on the order of about 80percent of the information cycle. This would make discrimination at the receiver end impractical. As down or off time increases relative to on time, this situation gets even worse.

However, if for example two sine wave cycles were employed for the information pulse and the down time corresponded to two more cycles, then the maximum amplitude of the unwanted pulse even for 100percent modulation would be down to about 70percent of the information pulse amplitude which, coupled with the use of only partial modulation, and also optimum frequency selection as hereinafter described, has been found satisfactory in experimental apparatus. Thus, according to the invention a preferred minimum ratio of total time from the start of one pulse to the start of the next pulse to pulse down time is two. This is accomplished as a practical matter in the equipment by employing a minimum character information tone burst of two sine wave cycles, and having a normal down time equivalent to only two sine wave cycles. Since the average character information will be contained in from about four to about seven sine wave cycles, the average effect of the unwanted PDM distortion half-cycle will be reduced to a relatively low value.

Optimum frequency selection for the sine wave bursts is another important factor in minimizing PDM distortion. According to Fourier analysis of the pure sine wave employed in the invention, even harmonics cancel out, so that the nearest harmonic disturbances are the subharmonic at two-thirds of the operating frequency, and the third harmonic at three times the operating frequency. By selecting an operating frequency in a preferred range of from about 2.9 KHz to about 3.3 KHz, with a preferred frequency of approximately 3.1 KHz, the natural rolloff of the telephone system substantially completely eliminates the third harmonic, and the two-thirds subharmonic can be substantially completely eliminated by means of a regenerative high pass (low rejection) filter, which will also filter out the lower subharmonics. A customer service frequency band of 2,450 Hz to 2,750 Hz is reserved by the telephone company, and rolloff at the upper end of the telephone band for most telephone systems does not become a major factor below about 3,400 Hz. Thus, the range of from about 2.9 KHz to about 3.3 KHz does not interfere with the reserved telephone band, and it does not involve serious degeneration from rolloff at the top end of the telephone frequency range. On the other hand, the area between about 2.9 KHz and 3.1 KHz, by being on the high side of the telephone frequency band, simplifies substantially complete elimination of the third harmonic and two-thirds subharmonic as aforesaid, and, as another important factor, makes a maximum number of sine wave cycles available per unit of time (i.e., per second), whereby a maximum amount of character information can be transmitted per second by the sine wave tone bursts of the present invention.

Further objects and advantages of the present invention will appear during the course of the following part of the specification, wherein the detailed circuit arrangements, mode of operation, and novel method steps of a presently preferred embodiment of the invention are described with reference to the accompanying drawings, in which:

DETAILED DESCRIPTION

Figure 1:
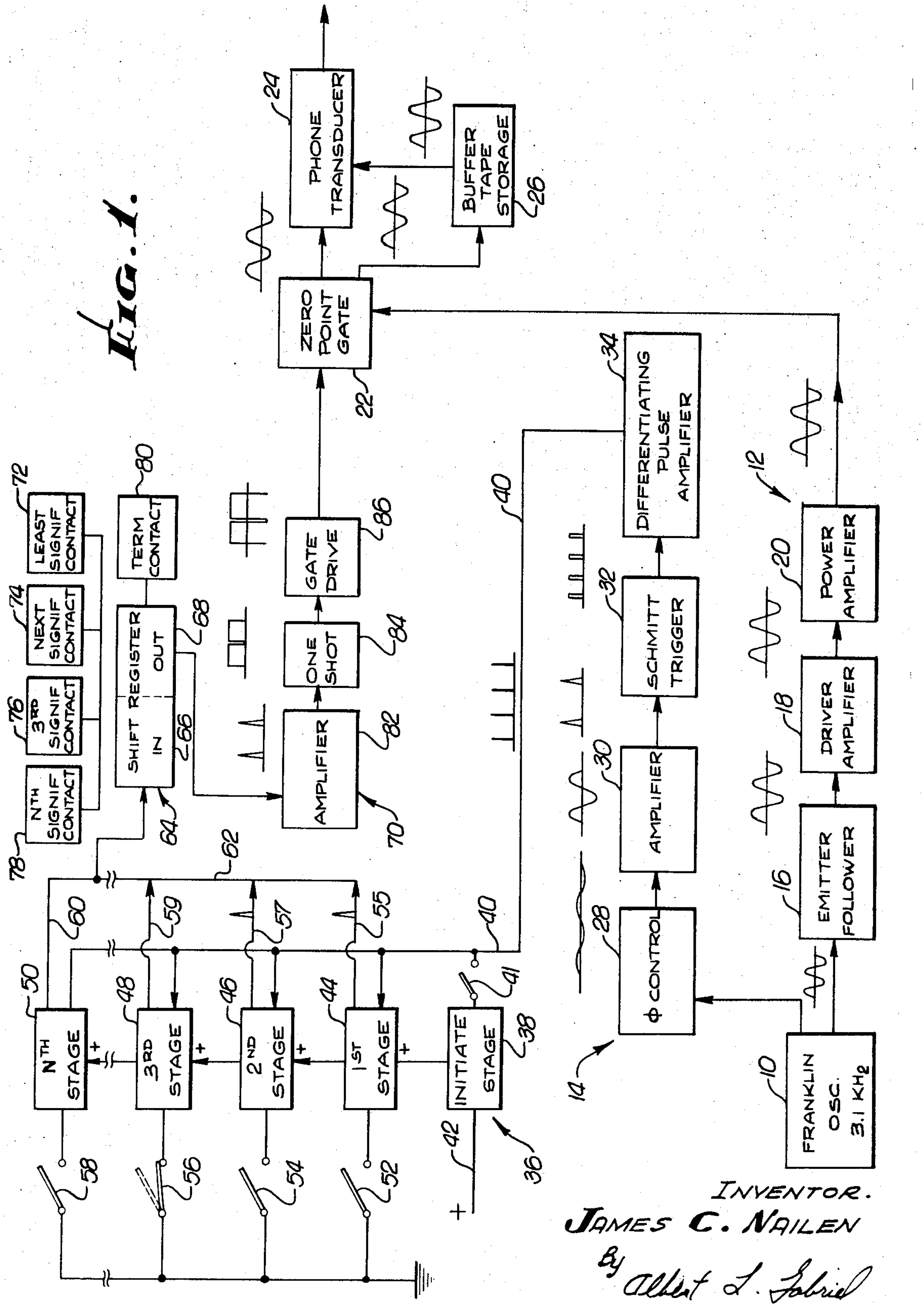
FIG. 1 is a block diagram of a presently preferred transmitter circuit arrangement according to the invention.

Referring at first to FIG. 1 which illustrates the presently preferred transmitter arrangement in block diagram, sine wave oscillations at the preferred frequency of 3.1 KHz are continuously generated in an oscillator 10, preferably a Franklin oscillator which is stable and which serves not only as the initial source of sine waves to be transmitted but also as a clock reference oscillator. The oscillator 10 has two outputs, one leading to a series of sine wave amplifiers generally designated 12 which prepare the sine wave for transmission, and the other leading to pulse conditioning circuits generally designated 14 which provide clocked reference pulses.

The sine wave amplifiers generally designated 12 include an emitter follower 16 which isolates the Franklin oscillator from load variations of gain control, a driver amplifier 18, and a push-pull power amplifier 20. The output of power amplifier 20 is a free-running, continuous sine wave which is fed to a zero point gate 22 where tone bursts of this sine wave are gated to the transducer output 24 of the transmitter and to the buffer tape storage unit 26 which is also coupled to the transducer output to replay stored information for transmission.

The pulse conditioning circuits generally designated 14 include a phase control circuit 28 permitting accurate phase control of the clock reference pulse output of the pulse conditioning circuits 14. The attenuated sine wave output of phase control circuit 28 is fed to an amplifier 30 which amplifies the sine wave and then provides a differentiated spike output that drives a Schmitt trigger 32. Schmitt trigger 32 develops pulses having a steep wave front which are then fed into a differentiating pulse amplifier 34 which produces sharp spikes from the steep leading edges of the Schmitt trigger output pulses, the output spikes from the amplifier 34 being the clocked reference pulses which are produced ad infinitum during operation of the apparatus and are accurately synchronized and phase-adjusted relative to the continuous free-running sine wave output of power amplifier 12.

The clocked reference pulses are fed from amplifier 34 to a series of summing and sequence circuits generally designated 36 which are controlled by a series of switches associated with a business machine or other data terminal hardware, which in this instance will be assumed to be an adding machine since adding machines are adaptable for a wide variety of data terminal functions.

The summing and sequence circuits generally designated 36 include an initiate stage 38 connectable to the clocked reference pulse bus 40 leading from amplifier 34 through a normally open switch 41 that is associated with the adding machine arm or tote bar so as to close when the tote bar is run down. This allows the next spike in the clocked pulse train to enter the initiate stage 38 which functions as an electronic switch that is thus turned on to apply positive voltage from a power source 42 to a first stage 44 to arm the first stage 44 so that the next clocked reference pulse in the sequence will turn on the first stage, that is likewise an electronic switch circuit. Similarly, the first stage 44 will, upon thus being turned on, provide positive voltage to the second stage 46 so that the next pulse in the sequence will turn on second stage 46. Provided no other switch is closed, this sequencing through the various stages will continue through the third stage 48, fourth, fifth, sixth, etc., stages until the final or Nth stage 50 is reached. However, associated with each of the first to Nth stage is a grounding switch, including a grounding switch 52 for the first stage, a grounding switch 54 for the second stage, a grounding switch 56 for the third stage, and a grounding switch 58 for the Nth stage. The grounding switches are also associated with the adding machine, the closure of a particular one of the grounding switches corresponding to a particular digit when the tote bar of the adding machine is run down. Closure of one of the grounding switches in effect grounds out the positive voltage supplied to the respective stage by the previous stage so that the grounded stage will not be turned on by the next clocked reference pulse in the sequence. The first through Nth stages 44, 46, 48, and 50, have respective pulse output conductors 55, 57, 59, and 60, all of which are connected to a clocked pulse train accumulator bus 62, and each of the stages which is turned on, subsequent to the initiate stage 38, will furnish a pulse spike to the accumulator bus 62 corresponding to the clocked reference pulse from the bus 40 which turned that stage on.

In the illustration of FIG. 1 the third stage grounding switch 56 is shown closed, so that the third stage 48 will not be turned on, and the accumulator bus 62 will receive pulses only from the first stage 44 and the second stage 46. Since all further stages beyond the third stage will only be turned on by a positive voltage signal passed from the third stage, none of the other stages beyond the third stage will be turned on. If the termination machine is an adding machine, the two pulses thus fed to the accumulator bus 62 may correspond to any desired figure on the adding machine. If other equipment is used at the termination, then the two pulses fed to accumulator bus 62 may correspond to any desired character information.

The number of stages capable of passing pulses to accumulator bus 62 may be any desired number according to the type of termination device and type of character information. For example, if the character information is numerical, as from an adding machine, typically the Nth stage will be the 16th stage, with the 1st through 10th stages providing a number of pulses to accumulator bus 62 corresponding to the numbers one to zero, and additional stages being available for control pulses indicating such things as start of message, end of message, decimal point, etc.

For simplicity in the illustration, the first stage 44 is shown as passing a pulse to accumulator bus 62 corresponding to a numerical output of the adding machine. However, as stated hereinabove, in the presently preferred form of the invention character information will be designated by a minimum of two sine wave cycles so as to diminish PDM distortion. Accordingly, it is preferred that character information be first designated from the second stage 46 so that there will be a minimum of two pulses provided accumulator bus 62 to designate character information.

The accumulator bus 62 is connected to a shift register generally designated 64, and including input and output sections 66 and 68, respectively, the output being connected to gating signal development circuits generally designated 70. The shift register 64 may be of conventional construction, and it includes least significant, next significant, third significant, and Nsignificant contact means 72, 74, 76, and 78, respectively, associated with the adding machine. The cessation of two successive pulses from the accumulator bus 62 in the shift register 64 informs the shift register that the pulse train for the least significant figure from the adding machine has been completed, whereby the shift register 64 causes the least significant figure contact means 72 to shut down that pulse train, and the next significant figure contact means 74 then initiates the pulse train for the next significant figure from the adding machine. Upon the cessation of two more successive pulses from accumulator bus 62, the shift register 64 then causes the next significant figure contact means 74 to shut down the second pulse train and the third significant contact means 76 then initiates the third pulse train representing the third significant figure from the adding machine, and this sequence continues for as many significant figures as are provided by the adding machine, the final significant figure being controlled by the Nth significant figure contact means 78.

The cessation of two further pulses from accumulator bus 62 following the pulse train from the final significant figure actuates termination contact means 80 associated with shift register 64, which permits the passage of sixteen successive pulses in a string which provide a signal for binary countdown means associated with the receiver indicating completion of the block of characters, designating shift and roll for the next block of characters.

Accordingly, the output section 68 of shift register 64 provides character information pulse trains to gating signal development circuits generally designated 70, which commence with a pulse train amplifier 82 which builds up the pulse train spikes and feeds them to a one shot or monostable multivibrator 84. The one shot 84 is adjustably timed to be turned on by each spike for approximately 95 percent of the time interval between spikes, thus allowing the approximately 5 percent remaining time for the one shot 84 to turn itself off and get ready for the next pulse in the train to turn it back on. In other words, the one shot 84 has a preferred duty cycle of approximately 95 – 5 percent. By utilizing good circuit components, this duty cycle can be brought up to approximately 97 percent, but it has been found in experimental equipment according to the invention that a duty cycle of 90 – 10 percent or above will provide sufficiently accurate gating for the system to work satisfactorily, with a preferred duty cycle of approximately 95 – 5 percent.

The one shot multivibrator 84 provides this 95 – 5percent duty cycle square wave output to a gate drive circuit 86 which sharply defines the duty cycle and provides the required power for driving the zero point gate 22. The output of gate drive circuit 86 is biased so that the 95 percent – 5 percent duty cycle square wave is generally centered on both sides of the zero voltage reference line.

The zero point gate 22 is opened at the initiation of each square wave from gate drive 86, and at the same time a sine wave cycle from power amplifier 20 is commencing at its zero crossover point. The square wave holds the gate 22 open for substantially 95 percent of a complete sine wave cycle, and closes the gate when the square wave turns negative within 5 percent of the completion of a full sine wave cycle proximate the zero crossover point. Accordingly, each square wave from gate drive 86 which corresponds to a discrete pulse introduced into the amplifier 82, allows the passage through the zero point gate of one substantially complete sine wave cycle which commences and terminates substantially at the zero crossover point. By deriving both the square wave gating signal and the sine wave that is gated from the same oscillator 10, and by proper adjustment of the phase control circuit 28, the initiation and termination of each sine wave cycle can be adjusted very close to the zero crossover point.

Accordingly, the zero point gate 22 provides a sine wave pulse train output having a number of sine wave cycles that corresponds to the number of pulses passed through the summing and sequence circuits 36 or other corresponding circuit arrangement providing a series of clocked pulses corresponding to a particular character of information. Preferably the minimum number of sine wave cycles passed through zero point gate 22 in any one burst is two full cycles, for minimization of PDM distortion as discussed hereinabove.

Figures 2, 4:
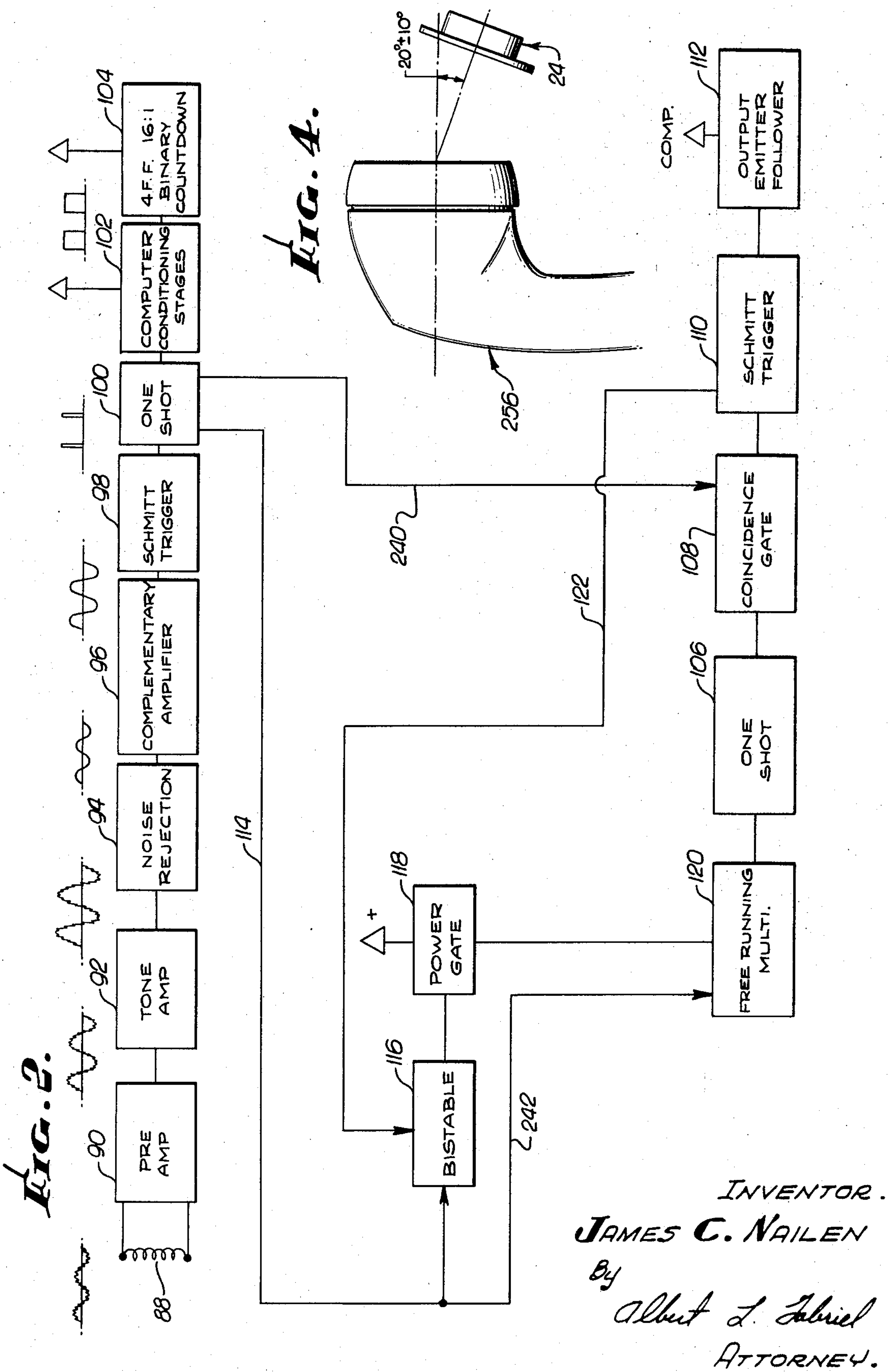
FIG. 2 is a block diagram of a presently preferred receiver circuit arrangement according to the invention.
FIG. 4 is a schematic illustration showing the axial orientation of the transmitter output transducer relative to a telephone handset microphone.

Reference will now be made to FIG. 2 of the drawings which illustrates in block diagram a presently preferred receiver circuit arrangement of the present invention. The pulse sine wave character information is picked up from a telephone handset receiver earpiece by a magnetic pickup coil 88 which is provided in a suitable mask (not shown) fitting directly over the handset earpiece. A magnetic pickup is preferred as it eliminates acoustical noise. In experimental apparatus according to the invention an air core coil having approximately 4,000 turns of No. 34 wire was found to be satisfactory, although it will be apparent that any suitable magnetic pickup will be sufficient. The air core coil is preferred to cores having metal or other cores as the latter appear to become oriented to low frequency noise that is present in most places, such as the 60 cycle AC power noise. The pickup coil 88 feeds the weak sine wave inputs bursts of the receiver to a pre-amplifier 90 which is preferably completely shielded, and provides straight high gain, high quality amplification of a factor of about 1,000, resulting in an output on the order of about 50 millivolts that is provided to a tone amplifier 92 having an output on the order of about 1 volt that is modulated with a lot of noise which is then removed in a diode noise rejection circuit 94 to provide a small amplitude, clean signal which is then increased in amplitude in a complementary amplifier 96 to drive a Schmitt trigger 98.

The Schmitt trigger output pulses have regularly spaced leading edges, but are not necessarily uniform in thickness (time duration) because of possible variations in amplitude of the signal that drives the Schmitt trigger, but the output pulses of the Schmitt trigger are directed into a one shot or monostable multivibrator 100 that provides an output square wave signal of identical pulses, wherein the number of pulses corresponds to the number of sine wave cycles in each tone burst sensed by the magnetic pickup coil 88 of the receiver. The one shot multivibrator 100 can have any desired duty cycle as will best suit the computer to which the pulse signal therefrom is fed, as for example a typical duty cycle of 50 percent. This pulse signal is then fed to computer conditioning stages generally designated 102, the output of which is fed to a computer. Also connected to the computer conditioning stages is a binary countdown circuit means generally designated 104 including four flip-flops providing a 16-to-1 countdown that produces one pulse output in response to 16 straight pulses to indicate the end of a block of characters, and hence shift and roll.

The output of the computer conditioning stages 102 represents only a portion of the information that is required by the computer; the computer also must be informed when each character is completed. This is accomplished by utilizing signal from the one shot multivibrator 100 to drive and synchronize an identical one shot multivibrator 106 which has a free-running output that is fed to a coincidence gate 108 and also receives signal directly from the one shot 100. There is no output from the coincidence gate until a pulse string from one shot 100 terminates, and then, since the output of one shot 106 is free-running, the very next pulse from one shot 106 will pass through the coincidence gate 108, which will in turn fire a Schmitt trigger 110 which delivers a pulse through an output emitter follower 112 to the computer to designate the end of a character.

Referring now to the circuit arrangement for driving the one shot multivibrator 106, signal is fed from one shot 100 through conductor 114 to a bistable multivibrator 116 which, when turned on by the first pulse of a character from one shot 100 remains on until turned off. The bistable multivibrator 116 thus acts as a switch that is turned on by the first pulse of a character, and when thus turned on it in turn turns on power gate 118 which drives a free-running multivibrator 120 preferably having a balanced 50 percent duty cycle. The free-running multivibrator 120 is synchronized with the one shot multivibrator 100 by connection of line 114 thereto, and the free-running multivibrator 120 drives the one shot multivibrator 106 the signal output of which is substantially identical to the signal output of the one shot multivibrator 100.

As soon as the Schmitt trigger 110 is fired by the next pulse from one shot 106 after pulses cease from the one shot 100, and the computer is thus informed of the end of a pulse string for a character, it is then necessary to turn off the free-running signals from the one shot multivibrator 106 to make the circuit ready for the next pulse string. This is accomplished by providing part of the Schmitt trigger signal output through a conductor 122 back to the bistable multivibrator 116 to turn off the bistable.

Reference will now be made to FIGS. *3a*, *3b*, *3c*, and *3d*, which illustrate a presently preferred detailed circuit arrangement for the transmitter circuit shown in block diagram in FIG. 1. Presently preferred values of various circuit components are noted on the drawings, and also all NPN transistors are preferably 2N3567 or equivalent unless noted, and all PNP transistors are 2N3638 or equivalent. However, it is to be understood that the circuit component values and transistor types are presented by way of illustration only, and not of limitation.

Turning at first to FIG. *3a*, this illustrates the Franklin oscillator 10 which is preferably set at about 3,100 Hz, and is sufficiently stable for reliable operation at 3,100 plus or minus 10 Hz. The Franklin oscillator 10 has one output conductor 124 leading to the phase control circuit 28, while its other output leads the emitter follower 16, which serves to isolate the Franklin oscillator from load variations resulting from adjustment of gain control potentiometer 126 providing the connection from emitter follower 16 to the driver amplifier 18. Playback input from the buffer tape recorder 26 is preferably also introduced through a conductor 128 to the input of the driver amplifier 18 to obtain the benefit of amplification from driver amplifier 18 and the push-pull power amplifier 20 which is transformer coupled to driver amplifier 18.

The power amplifier 20 is coupled to zero point gate 22 by means of a transformer 130 to provide the continuous, free-running sine wave signals to the zero point gate 22 for gating this sine wave signal into the tone bursts corresponding to character information.

The substantially 95 – 5 percent square wave gating signal from gate drive circuit 86 is provided to the zero point gate 22 through conductor 132 which connects to the zero point gate 22 at input point 134. Gating is accomplished by transistor 136 closing and transistor 138 opening when the input point 134 is driven negative by the gating signal, and transistor 136 opening and transistor 138 closing when the gating signal drives the input point 134 positive. Bias voltage source 140 connected to input point 134 is adjustable to vary the base control of the gating transistors 136 and 138 so as to provide the desired amount of modulation of the gated signal, preferably in the range of from about 40 to about 80 percent modulation.

A source 142 of a large negative voltage is also selectively connectable to the input point 134, which opens up the gate transistor 138 and clamps the gate transistor 136 open, so that the gate circuit simply functions as an amplifier for playback from the buffer tape recorder through driver amplifier 18, push-pull amplifier 20 and the gate circuit 22 now operating as an amplifier.

The output of the gate circuit is through a step-up transformer 144 to output conductor 146 leading to the transducer 24, transformer 144 having an additional secondary 148 feeding output signals to the buffer recorder 26. Thus, for example, if the termination equipment were being employed to tabulate store or market receipts, the tone bursts representing such receipts could be stored in the buffer tape recorder 26 for an entire day, and then played back from the buffer recorder 26 and out over the lines at the end of the day in a very short period of time, as for example in less than one minute.

Figure 3A:
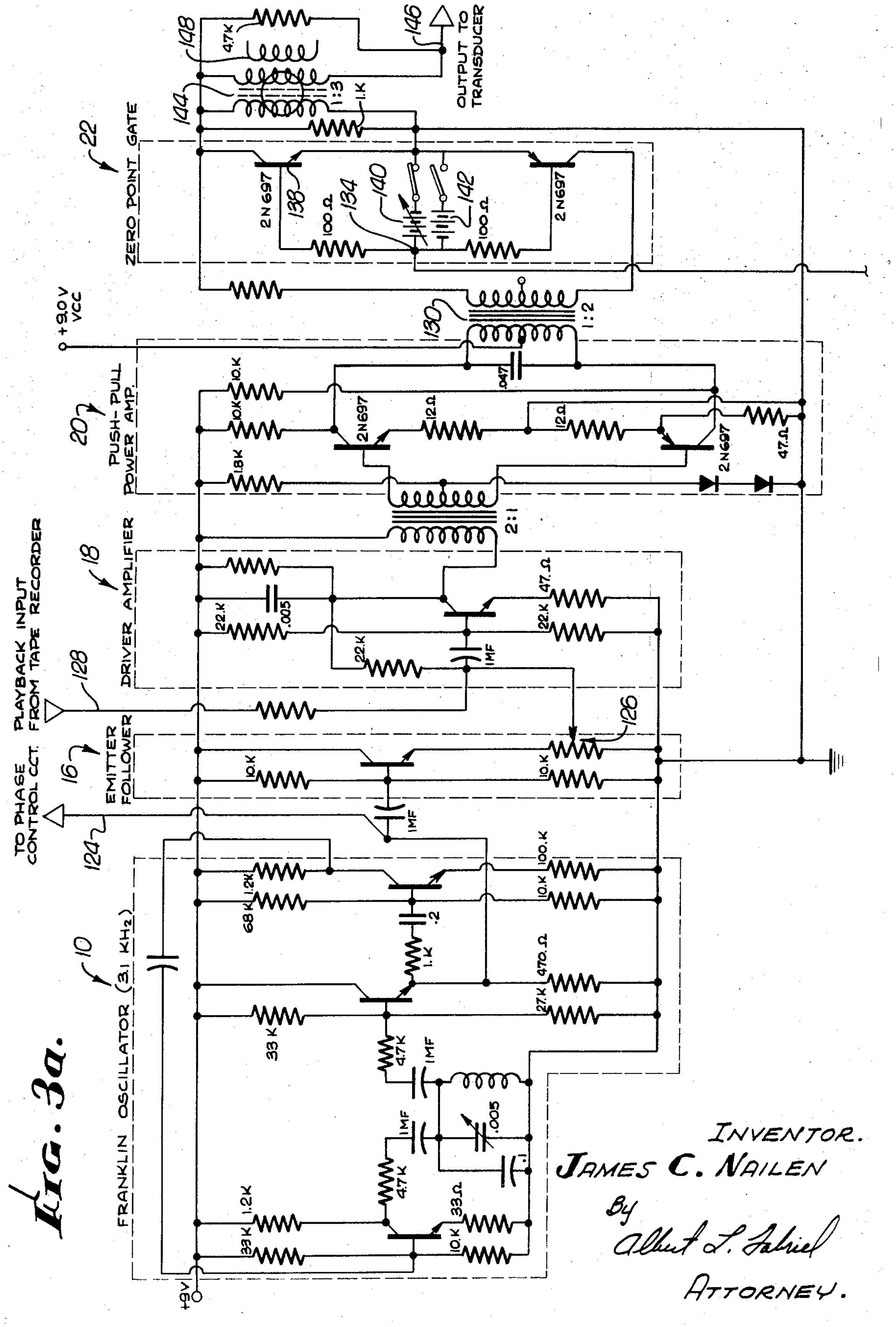
FIGS. 3*a*, 3*b*, 3*c*, and 3*d* are successive parts of a wiring diagram illustrating circuit details of the presently preferred transmitter shown in block diagram in FIG. 1.
Figure 3B:
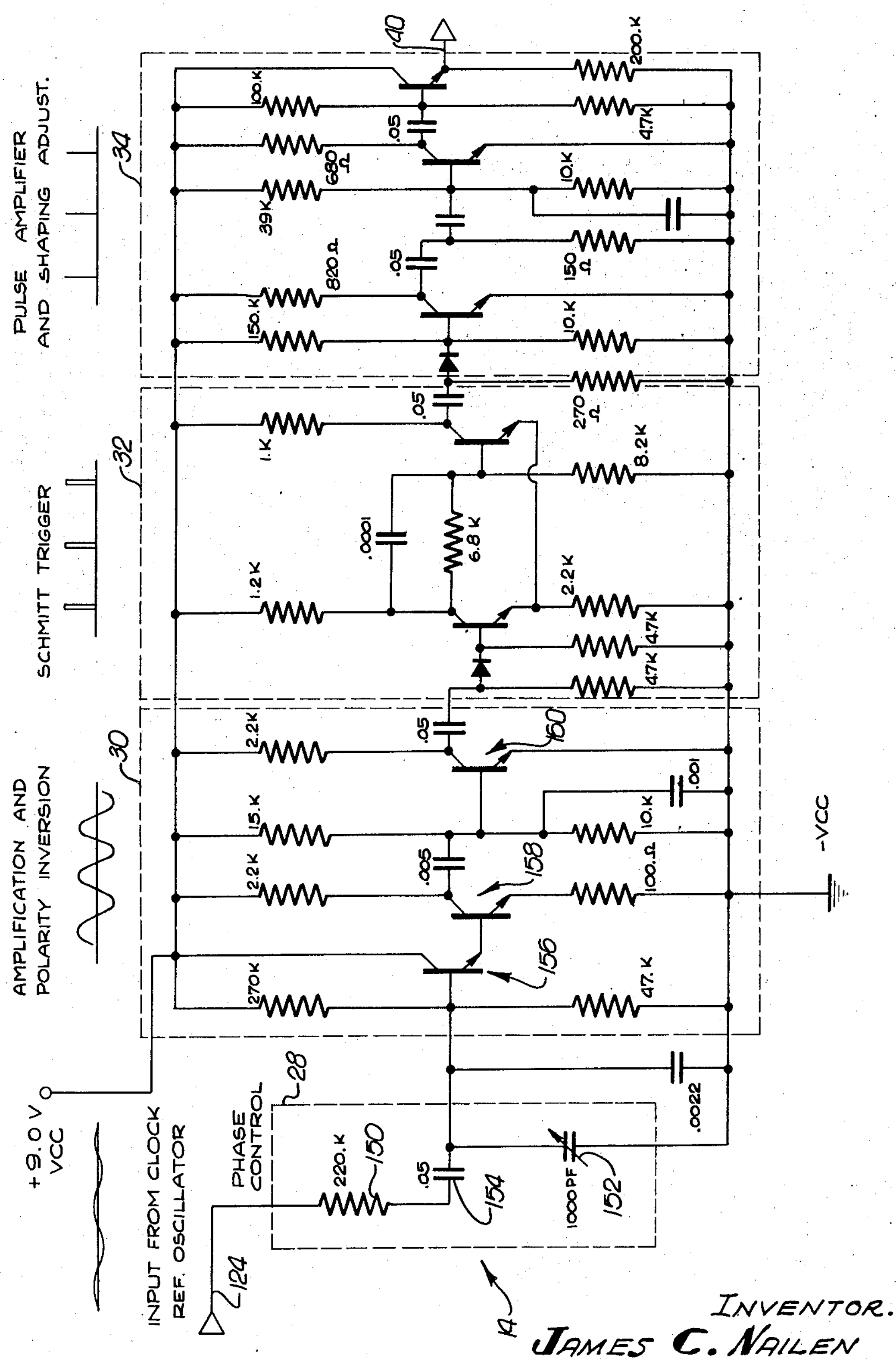

Reference will now be made to FIG. 3b, which illustrates presently preferred circuit details of the pulse conditioning circuits generally designated 14. The input is through conductor 124 shown in FIG. 3a from Franklin oscillator 10, and conductor 124 leads to phase control circuit 28, which provides accurate phase adjustment through the series phase adjusting circuit arrangement including resistor 150 and variable capacitor 152, the intermediate capacitor 154 simply being a coupling capacitor. Adjustment of variable capacitor 152 permits accurate phase adjustment and hence synchronization of the clocked reference pulses produced by the pulse conditioning circuits 14 relative to the sine wave signal that is to be gated into bursts, and accordingly provides accurate adjustment of the zero point gating of sine wave tone bursts.

The signal output from phase control circuit 28 is considerably attenuated, and is first fed to an emitter follower 156 which is part of the amplifier 30 so as to not load down the high impedance of the phase adjusting components. While this further attenuates the voltage signal, it provides the necessary current to drive the next section 158 of the amplifier 30 which provides amplification and polarity inversion. The following section 160 of amplifier 30 functions as a differentiating amplifier providing a spike output to feed the Schmitt trigger 132 which is the next portion of the pulse conditioning circuit means 14. The Schmitt trigger 132 provides the steep wave front desired to obtain very sharp spikes from the differentiating pulse amplifier 34, wherein the sharp spikes are obtained from the leading edges of the Schmitt trigger output pulses. The output of differentiating pulse amplifier 34 is to the clocked reference pulse bus 40.

Figure 3C:
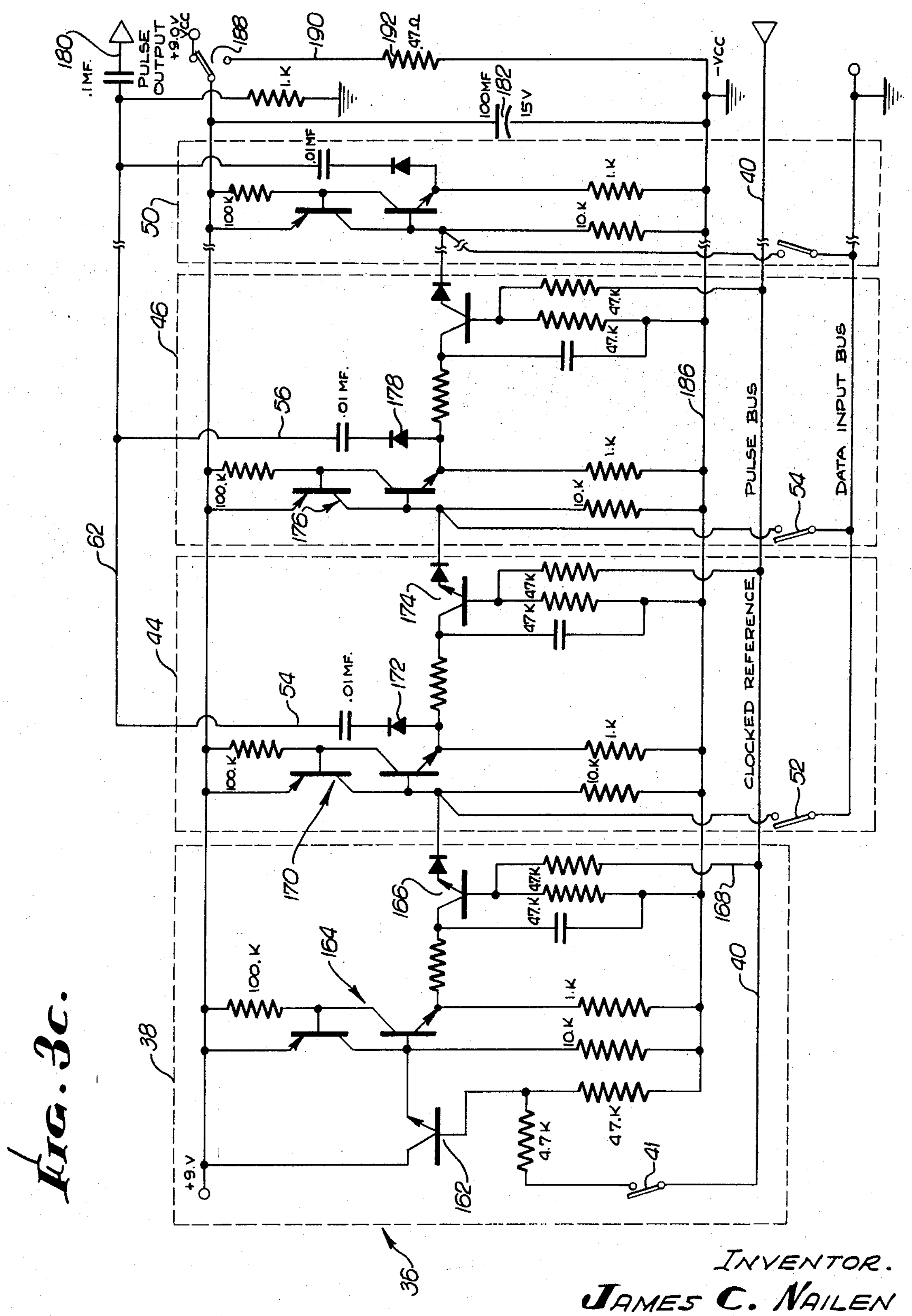

Turning now to FIG. 3*c*, this illustrates presently preferred circuit details of the summing and sequence circuits generally designated 36. The clocked reference pulse bus 40 leading from the differentiating pulse amplifier 34 of FIG. 3*b* enters FIG. 3*c* near the lower right-hand corner thereof, leading across to the left to initiate stage 38 which receives clocked reference pulses through bus 40 to commence a counting sequence only when the initiate switch 41 is closed when the adding machine tote bar or other termination device is actuated. When the initiate switch 41 is thus closed, the next pulse furnished on the bus 40 runs the base of transistor 162 positive thus locking the PNP-NPN transistor pair 164 on solid, the transistor pair 164 being a two-transistor equivalent of a four-layer diode. This applies approximately 8 volts to the collector of transistor 166 which operates as a gate that turns on the first summing or counting stage 44. By this means the gate 166 is armed, and assuming that the grounding switch 52 for the first stage 44 is open, then the next clocked reference pulse provided in bus 40 will be conducted through conductor 168 to run the base of transistor 166 positive which causes the transistor pair 170 of first stage 44 to be turned and locked on, thereby providing a pulse through a steering diode 172 and pulse output conductor 55 to the clocked pulse train accumulator bus 62. At the same time, positive voltage from the transistor pair 170 in effect arms the next transistor gate 174, so that assuming the grounding switch 54 for the second summing or counting stage 46 is open, the next clocked reference pulse on bus 40 will turn on the transistor pair 176 of stage 46.

When the transistor pair 176 is thus turned on and locked on, it furnishes a second pulse through steering diode 178 and pulse output conductor 57 to the clocked pulse train accumulator bus 62.

This sequence of turning the successive sequence stages on and providing corresponding pulses to the accumulator bus 62 will continue until one of the grounding switches is closed, and that will prevent the next pulse on bus 40 from turning on the next stage in the sequence, and accordingly none of the further stages in the sequence can be turned on.

In order to prevent FIG. 3*b* from becoming unduly complicated, the first, second, and Nth stages 44, 46, and 50, are the only summing and sequence stages illustrated in circuit detail, but it will be apparent therefrom as to the construction and operation of any number of intermediate stages.

By providing the initiate stage 38 that is first armed by closure of the initiate switch 41 and then energized by the first pulse on bus 40, there is no danger of the first pulsing stage 44 being turned on by a partial pulse, and clean pulsing is assured. Thus, by this means contact bounce is eliminated; there is no danger of a partial or false pulse coming from any of the stages, or a resulting inaccurate sine wave burst from the apparatus.

The pulse output from accumulator bus 62 is provided through output conductor 180 to the shift register 64. A large filter capacitor 182 is provided between the positive and negative power buses 184 and 186, respectively, for the summing and sequence circuits generally designated 36. A reset switch 188 momentarily shorts the positive bus 184 to ground through a conductor 190 when the signal has ceased in order to reset all of the summing and sequence circuits to the open condition. Although this reset switch 188 is illustrated as a mechanical switch, it is to be understood that this is for convenience of illustration only, and this can be in the form of a fast-acting transistor embodied in conventional switching circuitry. A bleed resistor 192 is included in the conductor 190 to slow the bleed-off down to an interval on the order of about 10 milliseconds to prevent the large filter capacitor 182 from damaging the reset switch 188 with its current surge.

Figure 3D:
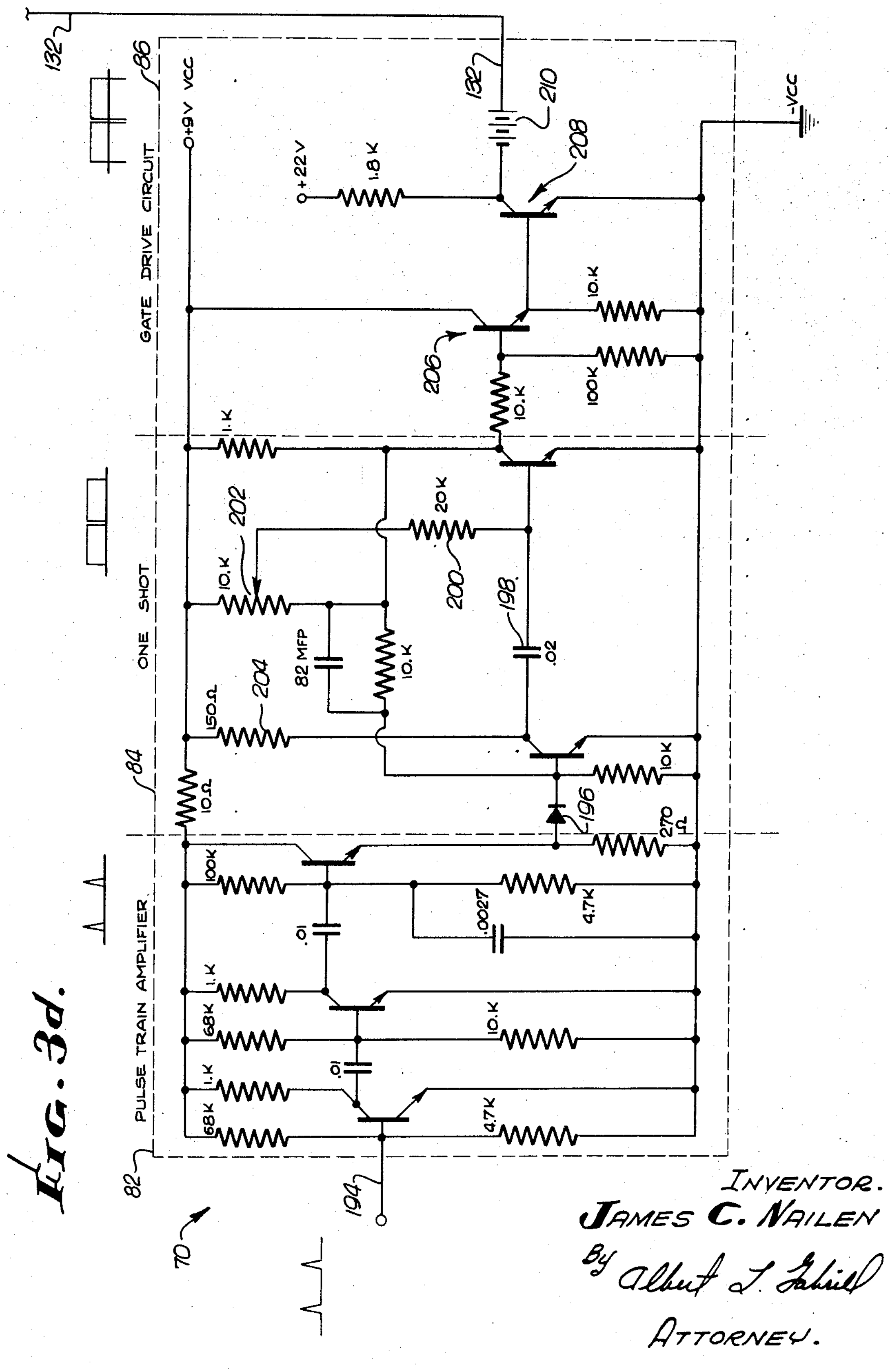

Referring now to FIG. 3*d*, this illustrates the gating signal development circuits generally designated 70 in FIG. 1. The input conductor 194 receives a pulse train either directly from the pulse output conductor 180 associated with the accumulator bus 62 of FIG. 3*c*, or from a shift register such as the shift register 64 illustrated in FIG. 1. The pulses are fed through conductor 194 to pulse train amplifier 82 which is a straight amplifier to build up the relatively weak pulse train signal input thereto. The amplified pulses are then fed to the one shot or monostable multivibrator 84 through an input diode 196 which keeps the one shot from turning itself off. As stated in connection with FIG. 1, this one shot multivibrator 84 has a preferred working cycle of at least 90 – 10 percent, and preferably about 95 – 5 percent. This requires abnormal circuit components for the one shot 84. Thus, the capacitor 198 and resistor 200, through the potentiometer 202, govern the on time of the one shot, while the capacitor 198 and the resistor 204 govern the off time thereof. With a conventional one shot multivibrator, the capacitor 198 is only on the order of about 0.0001 Mf, while in the present circuit it is a great deal larger, namely, preferably about 0.02 Mf. The resistor 204 in a conventional one shot circuit is normally about 1,000 ohms, while in the present circuit it is only about 150 ohms. The potentiometer 202 allows adjustment of the wave form up to about 98 percent on time, and then instability of the circuitry tends to cause a problem of lead-over into the next wave. For this reason, it is preferred not to go all of the way up to a 98 – 2 percent duty cycle, but to have a stable wave form of approximately 95 – 5 percent duty cycle, which is entirely adequate for the present purpose.

The output of the one shot multivibrator 84 is to the gate drive circuit 86, which includes an emitter follower 206 employed to convert the voltage pulse from the multivibrator primarily into a current pulse, and this drives a switching transistor 208 which is either turned all of the way on or all of the way off, to provide the sharp gating signal output that is furnished to the zero point gate 22 through conductor 132 as illustrated in FIG. *a*. Voltage source 210 in conductor 132 biases the signal output of switching transistor 108 so that the output signal is approximately equally balanced on opposite sides of the zero voltage line, to best meet the requirements of the zero point gate 22.

FIG. *5a* shows details of the presently preferred preamplifier 90, which is preferably completely shielded as indicated by the dashed outline around the pre-amplifier. The input to pre-amplifier 90 is through magnetic pick-up coil 88 which, as aforesaid, is directly associated with the earpiece of a telephone handset by disposition in a mask or other suitable attachment device. The pre-amplifier 90 provides a total voltage-to-current gain on the order of about 500,000, but by employing degenerative or inverse feedback, the overall amplification is down to about 1,000, but with good quality. Thus, the pre-amplifier 90 provides high gain, high quality straight amplification of the incoming signal, which is on the order of only about 1 to 10 millivolts. While presently preferred circuit component values and transistor types are noted on FIG. *5a*, it to be noted that these are given by way of example only, and not of limitation. The same is true for FIGS. *5b* and *5c*, wherein all NPN transistors are 2N3567, and PNP transistors are 2N3638, unless otherwise noted. The pre-amplifier 90 has output conductor 212 which is seen as the input conductor in FIG. *5b*, leading to tone amplifier 92. At the input of tone amplifier 92 is a high frequency degeneration circuit including resistor 214 and capacitor 216. The gain of tone amplifier transistor 218 is controlled by a variable resistor 220, and the output thereof is fed through a voltage step-up transformer 222 to the noise rejection circuit 94 which is simply a series arrangement of diodes generally designated 224, any number of which can be switched into the circuit as desired for noise rejection. The diode string 224 simply allows the signal peaks to pass through, rejecting all voltages below the sum of the contact voltages of the diodes that are in series, which is about 0.6 volts per diode. Thus, the signal voltage peaks, which are averaged or rectified, are passed through the diodes 224 with virtually all hash removed, and these are fed to the complementary amplifier 96 comprising transistor pair 226 which is biased by a pair of diodes generally designated 228. The output of complementary amplifier 96 is fed through an adjusting potentiometer 230 to Schmitt trigger 98 which provides a number of pulses of substantially equal amplitude or height corresponding to the number of sine wave cycles received in the receiver. These pulses are then fed through an inverter circuit generally designated 232 to the one shot multivibrator 100 which gives the pulses the desired constant width for the computer. Computer conditioning stages are generally designated 102, and include an output 234 to a digital counter or to a buffer storage, or both, or to a BCD counter. Alternate output 236 is provided for a ground termination system.

FIG. *5c* illustrates presently preferred detailed circuitry for the portion of the receiver system that tells the computer when a pulse string has stopped, and this part of the receiver system receives a signal from the one shot multivibrator 100 shown in FIG. *5b* through output conductor 114 to bistable multivibrator 116 shown in FIG. *5c*, and also receives a signal from one shot multivibrator 100 through output conductor 240 which connects with the coincidence gate 108 of FIG. *5c*.

Referring now particularly to FIG. *5c*, the first pulse on conductor 114 from one shot multivibrator 100 turns on the bistable multivibrator 116, which stays on until turned off as described hereinafter. This then functions as a switch providing power through power gate 118 to free-running multivibrator 120 which preferably has a balanced, 50 percent duty cycle. The free-running multivibrator 120 is synchronized with the one shot multivibrator 100 of FIG. *5b* by connection through a line 242 with the conductor 114.

Figure 5A:
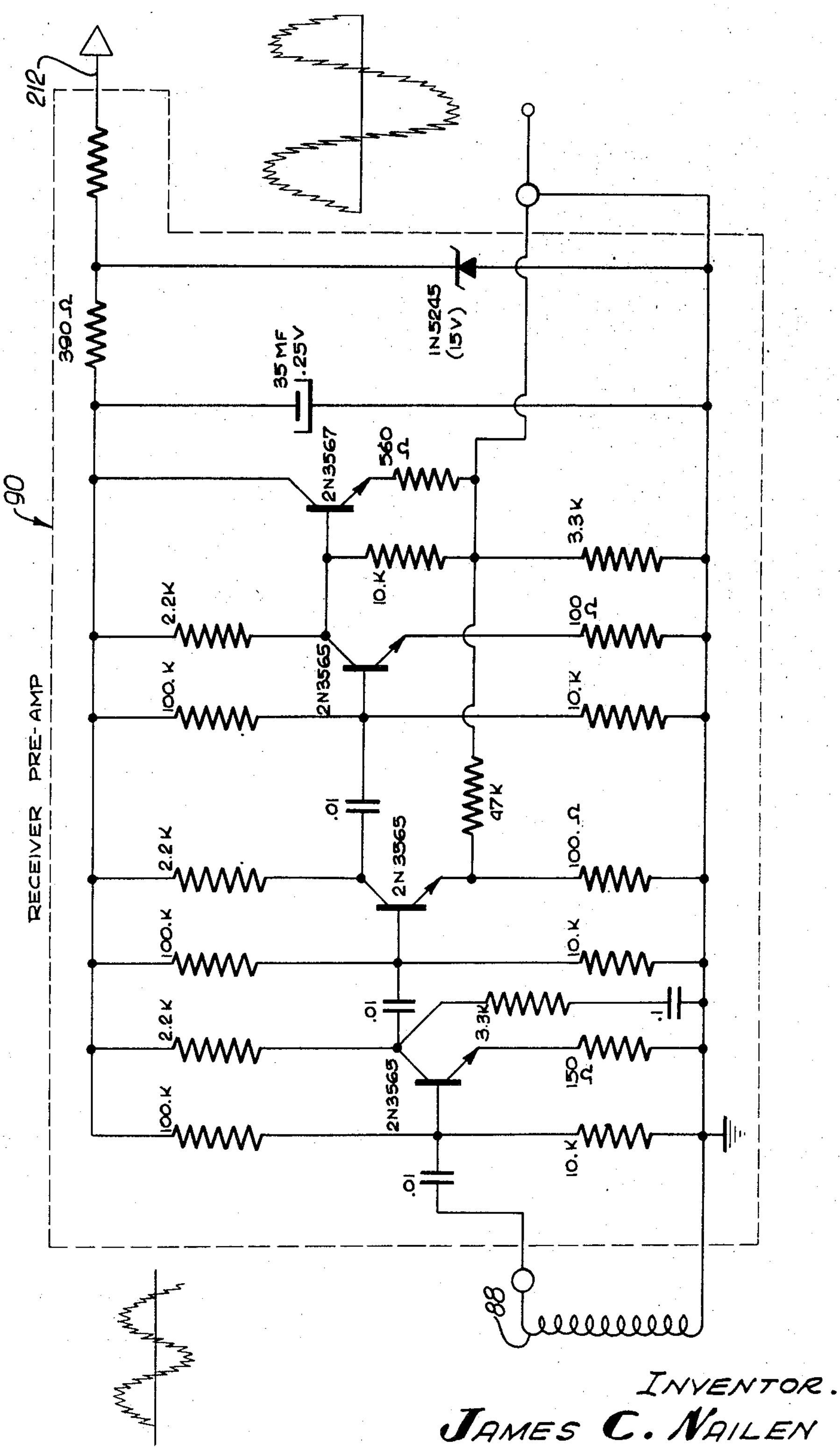
FIGS. 5*a*, 5*b*, and 5*c* are successive parts of a wiring diagram illustrating circuit details of the presently preferred receiver which is shown in block diagram in FIG. 2.
Figure 5B:
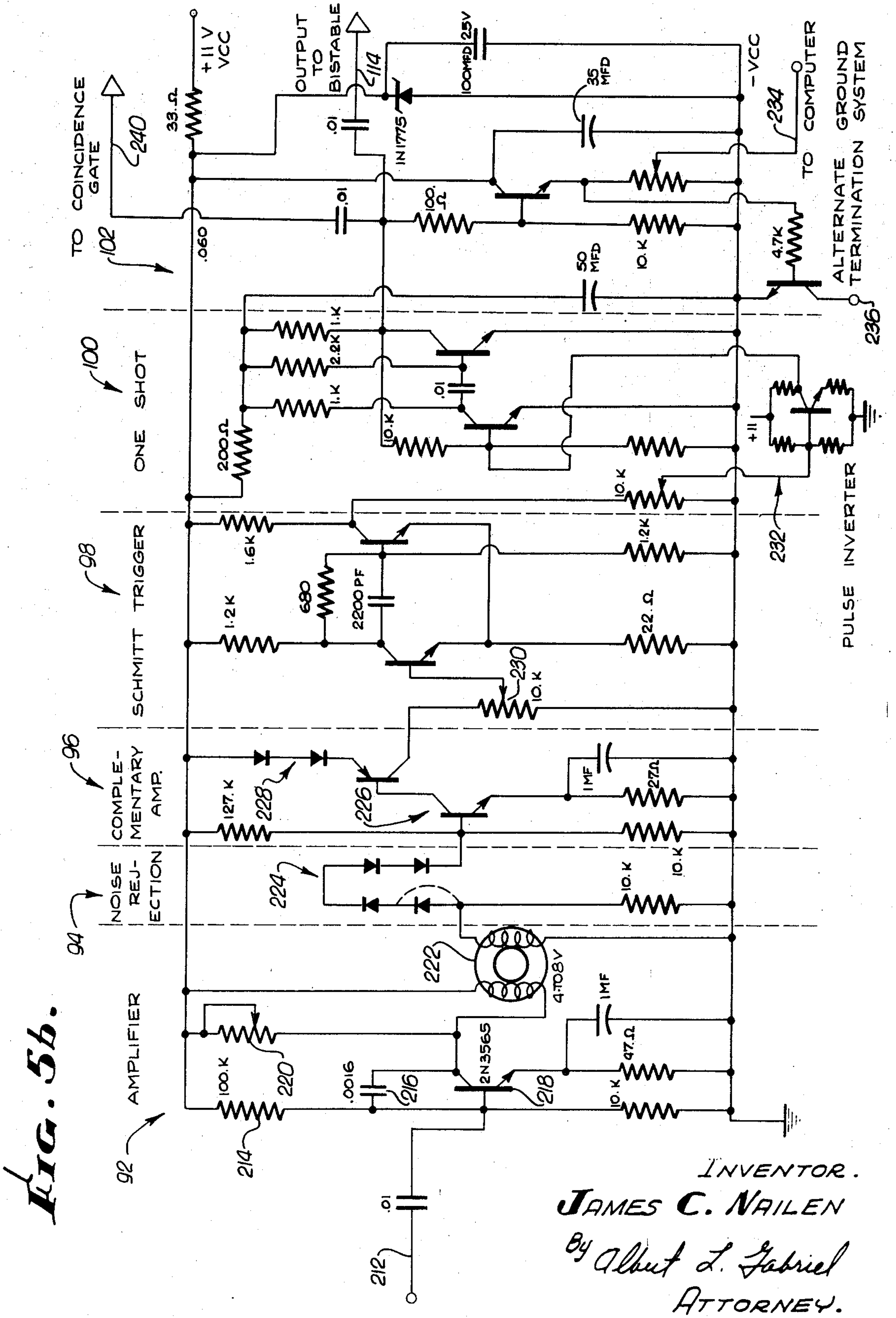
Figure 5C:
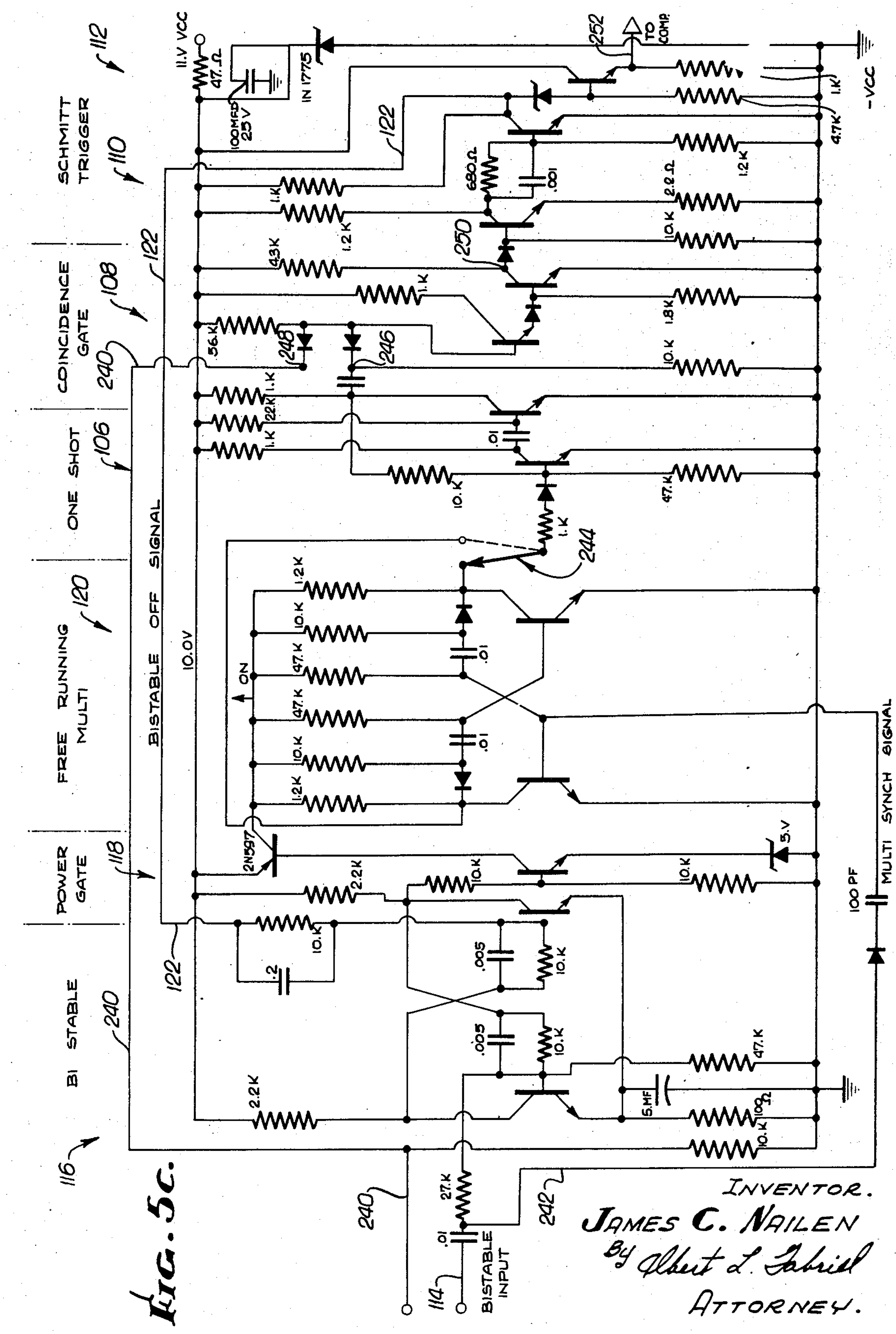

The output of the free-running multivibrator 120 is furnished through a polarity option switch 244 to the one shot multivibrator 106 which provides an identical pulse output to that of the one shot vibrator 100 of FIG. 5b, this output being provided to the concidence gate 108 at input point 246, while the identical signal from one shot multivibrator 100 of FIG. *5b* is provided to the coincidence gate 108 through conductor 240 at input point 248. The coincidence gate 108 functions as a zero comparator, the coincident signals arriving at input points 246 and 248 serving to cancel each other out, until pulses cease from one shot multivibrator 100 through conductor 240 indicating the end of a pulse string, whereupon the next pulse appearing at input point 246 from one shot multivibrator 106 will drive coincidence gate output point 250 positive, which fires the Schmitt trigger 110. The output of Schmitt trigger 110 is fed to emitter follower 112 which conditions this output signal to be fed to the computer through conductor 252 for computer sequence control, telling the computer that the string of pulses is completed.

Firing of the Schmitt trigger 110 also provides an output pulse that is fed back through a conductor 122 to the bistable multivibrator 116, this pulse turning off the bistable multivibrator 116 and hence also turning off the free-running multivibrator 120 so that there will be no further pulses from the one shot multivibrator 106 and the Schmitt trigger 110 will not fire again until another pulse string has come through the receiver and has stopped.

FIG. 4 schematically illustrates the presently preferred relationship between the transmitter output transducer 24 and the carbon microphone portion 254 of a telephone handset 256. Suitable physical coupling means (not shown) is provided between the transducer 24 and the handset microphone 254, as for example a mask in which the transducer 24 is supported and which is adapted to engage over the microphone section 254 of the handset, or as another example, disposition of both the handset and the transducer in a common case or other receptacle, for orienting the axes of the transducer 24 and the microphone 254 at a preferred relative angle of about 20° plus or minus 10°, for optimum acoustic coupling therebetween, with a minimum amount of interference from standing wave patterns and echo effects which might otherwise seriously interfere with the operation of the system. These effects are preferably further minimized by covering the output of the transducer 24 with a diffusion screen (not shown). Additionally, by employing a ceramic transducer, preferably a barium titanate ceramic transducer, but alternatively a lead titanate ceramic transducer, ringing in the system is minimized, since these transducers have resonant frequencies above 10 Kc, or higher than the third harmonic of the preferred frequency of about 3.1 KHz. Although the present invention is not limited to the use of a transducer of any particular resonant frequency, it is preferred to have the transducer resonant frequency above 10 KHz, and preferably on the order of 30 KHz to 40 KHz or higher, which is the resonant frequency for a barium titanate ceramic transducer.

While the instant invention has been shown and described herein in what is conceived to be the most practical and preferred embodiment, it is recognized that departures may be made therefrom within the scope of the invention.

I claim:

1. The method of transmitting data which comprises generating a continuous sine wave electrical signal of substantially constant frequency, gating said sine wave signal to produce a plurality of successive bursts thereof, said gating determining the number of sine wave cycles in each of said bursts, and the number of cycle intervals between said successive bursts, each of said sine wave bursts designating assigned character information according to the number of sine wave cycles contained therein, converting said tone bursts after the transmission thereof to a plurality of pulse trains corresponding to the respective tone bursts, each of said pulse trains having the same number of pulses therein as sine wave cycles in its respective tone burst, sampling the pulses in each of said pulse trains and generating a free running pulse string substantially identical to each of said pulse trains, comparing each of said pulse trains with its respective said pulse string, and initiating a termination signal with the first pulse of said free running pulse string after the end of the respective pulse train.

2. Data transmitting and receiving apparatus which comprises a transmitter comprising circuit means for generating a continuous sine wave electrical signal, gating circuit means associated with the output of said sine wave generating circuit means, and data input means operatively connected to said gating circuit means to cause the latter to gate said sine wave signal to produce a plurality of successive bursts thereof designating assigned character information according to the number of sine wave cycles contained therein; and a receiver comprising input means for receiving said successive bursts of sine wave signal, pulse generating means connected to said input means and responsive to each sine wave cycle in said bursts of sine wave signal to generate a plurality of successive trains of pulses corresponding to said successive bursts of said sine wave signal, free running pulse producing means connected to said pulse generating means and synchronized therewith to produce an output of free running pulses that are substantially identical to the pulses from said pulse generating means, and comparator circuit means connected to the outputs of said pulse generating means and said free running pulse producing means, said comparator circuit means having an output responsive to the first pulse from said free running pulse producing means that is not accompanied by a pulse from said pulse generating means whereby to indicate the end of a pulse train from said pulse generating means.

3. The method of claim 1, which includes using said termination signal to turn off said free running pulse string.

4. Apparatus as defined in claim 2, which includes a feedback connection from said comparator circuit output to said free running pulse producing means for turning off said pulse producing means in response to the first pulse therefrom that is not accompanied by a pulse from said pulse generating means.

* * * * *